United States Patent [19]
Gantzer

[11] Patent Number: 6,103,123
[45] Date of Patent: Aug. 15, 2000

[54] AERATION DEVICE AND METHOD FOR CREATING AND MAINTAINING FACULTATIVE LAGOON

[76] Inventor: Charles J. Gantzer, 905 W. 48th St., Minneapolis, Minn. 55409

[21] Appl. No.: 09/157,468

[22] Filed: Sep. 21, 1998

Related U.S. Application Data

[60] Provisional application No. 60/059,805, Sep. 23, 1997.

[51] Int. Cl.[7] .................................................. C02F 3/30
[52] U.S. Cl. .......................... 210/605; 210/629; 210/170; 210/194; 210/220; 210/242.4; 261/35; 261/77; 261/123
[58] Field of Search ..................................... 210/605, 629, 210/630, 747, 170, 194, 220, 242.2; 261/28, 35, 77, 123

[56] References Cited

U.S. PATENT DOCUMENTS

| | | |
|---|---|---|
| 3,614,072 | 10/1971 | Brodie . |
| 3,794,171 | 2/1974 | Kimura et al. . |
| 3,794,303 | 2/1974 | Hirshon . |
| 3,956,124 | 5/1976 | Fast et al. ................................ 210/170 |
| 4,202,762 | 5/1980 | Fontein et al. ........................... 210/629 |
| 4,251,361 | 2/1981 | Grimsley . |
| 4,280,911 | 7/1981 | Durda et al. ............................. 210/629 |
| 4,293,506 | 10/1981 | Lipert . |
| 4,416,781 | 11/1983 | Bailey et al. . |
| 4,477,393 | 10/1984 | Kos . |
| 4,514,343 | 4/1985 | Cramer et al. . |
| 4,708,308 | 11/1987 | Snider . |
| 4,724,086 | 2/1988 | Kortmann ............................. 210/242.2 |
| 4,965,022 | 10/1990 | Litz . |
| 5,234,595 | 8/1993 | DiGregorio et al. ................... 210/605 |
| 5,314,619 | 5/1994 | Runyon .................................... 210/170 |
| 5,624,562 | 4/1997 | Scroggins ................................ 210/605 |
| 5,630,936 | 5/1997 | Oyzboyd ................................. 261/77 |

FOREIGN PATENT DOCUMENTS

| | | |
|---|---|---|
| 60025592 | 7/1983 | Japan . |
| 889631 | 12/1981 | U.S.S.R. . |

OTHER PUBLICATIONS

Today's Farmer, Jun./Jul. 1996, "Mixed Blessing" By Chuck Lay pp. 4 through 9.
Water Science Technology, vol. 22, No. 9, pp. 43–50, 1990 published in Great Britain, T.J. Schulz and D. Barnes.

*Primary Examiner*—Christopher Upton
*Attorney, Agent, or Firm*—Burd, Bartz & Gutenkauf

[57] ABSTRACT

A facultative lagoon, an airlift aerator for such a lagoon, and a method of operating such a lagoon. The aerator includes a U-shaped body with a down flow leg and an airlift leg and a float. The float sustains the U-shaped body with respect to the surface of polluted material contained in the lagoon. The upper ends of the legs are submerged slightly beneath the surface of the material in the lagoon. The down flow leg has a water inlet and the airlift leg has the water outlet. A bubble generator is connected to a lower portion of the airlift leg. Air supplied under pressure to the bubble generator introduces bubbles into the airlift leg which establishes a water circulation through the U-shaped body. Bubbles transfer oxygen to the passing water which is disbursed through the water outlet. The dissolved oxygen is used in the biodegradation of the hazardous and odorous gases of the waste material that would otherwise be emitted into the atmosphere.

19 Claims, 3 Drawing Sheets

AERATION DEVICE AND METHOD FOR CREATING AND MAINTAINING FACULTATIVE LAGOON

This application claims benefit of Provisional Application 60/059,805 filed Sep. 23, 1997.

BACKGROUND OF THE INVENTION

Large-scale pork production is a profitable industry in several regions of the Nation. Unfortunately, this economic success is often at the expense of local ambient air quality. The emission of hazardous and odorous gases from hog manure basins has polarized many rural communities. Public and regulatory pressure applied on the pork industry to control its air emissions already has slowed the expansion of the industry in certain regions. This has potentially severe economic consequences on rural and state economies. The continued economic viability of the regional pork industry and associated rural communities requires that pork production facilities adapt air pollution control technologies that ensure sustainable development. The same need for air pollution control exists in other industries with high-strength organic waste streams, such as the sugar refining, dairy, cannery, and food processing industries.

Modern, large-scale pork production is seldom cited as an example of sustainable development, because of the external and often unpaid costs associated with potential adverse effects on local water and air resources. The present trend is that the large-scale pork production facilities provide an increasingly greater fraction of the nation's pork production. The spatial concentration of hogs and hog manure in such facilities results in the release of hazardous and odorous gases that exceed the natural ability of the atmosphere to maintain by dispersion concentrations below acceptable levels. Hydrogen sulfide emitted from outdoor hog manure basins can be detected by substantial portions of the population for considerable distances downwind of the basin. The lack of cost-effective technologies to control the emission of hazardous and odorous gases limits the growth of hog industry at a time when the demand for pork products is increasing. These constraints may result from tougher zoning regulations or fear of litigation. For example, the Sep. 12, 1994 issue of Farmweek magazine published a story describing how neighbors of an 800-hog operation in Iowa were awarded $45,000 in damages because of noxious odors, and another story describing how public concerns over hog odors in North Carolina forced county zoning boards to prohibit hog operations in certain locations (e.g. within one mile of towns). Thus, the spatial concentration of hogs and hog manure into larger operations results in a potential reduction in local air quality, which has both public health and public nuisance components.

With the exception of North Carolina, currently most of the pork production in the United States occurs in the corn belt states and parts of their immediate neighbors. Table 1 indicates the monetary value of pork production to the central United States. The crop farmers of this region depend directly and indirectly on the pork and other livestock industries. Midwestern farmers have invested in pork production facilities on their own properties or as part of cooperatives to provide income when crop prices are low. However, the present inability to control the emission of hazardous and odorous gases threatens the livelihood of region's pork industry and the economic viability of rural communities. Such a loss of pork production would represent a significant loss to the Upper Midwest economy in terms of those activities involved directly (Table 1) and indirectly (corn and soybean growers, meat packers, distribution) with pork production.

TABLE 1

Pork production and direct market value for the 10 major pork producing states.

| Rank | State | Head marketed (In 1000's)a | Estimated Value (US $ in millions)b |
|---|---|---|---|
| 1 | Iowa | 24,160 | 3,020 |
| 2 | North Carolina | 11,455 | 1,432 |
| 3 | Minnesota | 9,724 | 1,216 |
| 4 | Illinois | 9,462 | 1,183 |
| 5 | Indiana | 7,846 | 981 |
| 6 | Nebraska | 7,346 | 918 |
| 7 | Missouri | 6,071 | 759 |
| 8 | Ohio | 3,623 | 453 |
| 9 | South Dakota | 3,329 | 416 |
| 10 | Kansas | 2,404 | 301 |

Aside from aerobic biological treatment, few (if any) technologies have been proven effective in reducing the emission of hazardous air pollutants and odorous compounds from hog manure facilities under diverse environmental and managerial conditions. Part of the problem in developing manure additives for odor control is that the specific compounds responsible for mal-odors have not been satisfactorily identified. Without knowing what the chemical targets are for odor control, the end result is an essentially blind development of odor control products that are only partially effective (at best) in controlling odors.

The anaerobic biodegradation of hog manure generates several general classes of compounds that are considered hazardous, odorous, or both. These classes compounds include ammonia, reduced sulfur compounds (hydrogen sulfide, mercaptans), volatile fatty acids (n-butyric acid, valeric acid), phenolic compounds (phenol, para-cresol), indoles (skatole, indole), and volatile amines (putrescine, cadaverine). In general, the more offensive odorous compounds are associated with the anaerobic biodegradation of proteins. Because of the wide range in chemical properties represented by these classes of hazardous and odorous compounds, no one additive or process can be expected to control all offensive odors—that is expect for aeration. Aeration and the associated aerobic biological treatment can result in the biodegradation of all the above hazardous and odorous gases.

High operating costs are currently associated with aerating large volumes of high strength wastes. It has been suggested that aerobic biological treatment should only be used in situations where odor control is essential, because of the high operating costs. The cost for aerobic biological treatment of the entire manure stream generated by a 150 lb finishing pig is estimated to be about $7.00 per marketed pig. This high operating cost for complete aerobic treatment of hog manure continues to limit its acceptance by the pork production industry.

One means of reducing the costs of aeration is to reduce the volume of water that is aerated by operating outdoor hog manure basins as facultative lagoons. Facultative lagoons have been used in the municipal and industrial waste water treatment industries for decades as a means of meeting treatment objectives with reduced aeration costs. A facultative lagoon is one that has an aerobic (oxygen present) layer above an anaerobic (no oxygen present) layer. The offensive hazardous and odorous gases generated in the anaerobic layer are oxidized by the aerobic (oxygen-requiring) bacteria found in the upper layer of a facultative lagoon and converted into inoffensive products. However, as shown in Table 2, the operating costs associated with using the traditional waste water treatment approach to a facultative lagoon are still too expensive for odor control at most pork production operations.

TABLE 2

Estimated aeration costs for the aerobic biological treatment of hog manure.

| Treatment Option | Aeration Operation Costs ($/hog marketed) |
|---|---|
| aerobic treatment of the entire hog manure basin | 7.00 |
| facultative lagoon as traditionally operated in the wastewater treatment industry | 3.70 |
| ideal facultative lagoon for odor control with biological ammonia oxidation in the upper aerobic layer | 1.50 |
| ideal facultative lagoon for odor control without biological ammonia oxidation in the upper aerobic layer | 0.25 |

Ideally, the operation of the facultative lagoon designed primarily for odor control should supply just enough aeration to biodegrade the hazardous and odorous gases that would otherwise be emitted into the atmosphere. Such an approach is feasible, because many of the offensive organic and inorganic gases released during the anaerobic decomposition of hog manure are preferentially biodegraded under aerobic conditions compared to the other components that make up the bulk biological oxygen demand of hog manure. Because the ideal facultative lagoon does not need to maintain sufficient dissolved oxygen concentrations to encourage nitrification, the oxygen demand associated with the biological oxidation of ammonia to nitrate can be removed from the oxygen requirement. Without nitrification, the aeration cost of odor control with the ideal facultative lagoon is $0.25/hog marketed.

As shown in Table 2, a facultative lagoon designed for odor control is significantly more cost effective than the other aerobic biological processes and has a theoretical minimum aeration cost of $0.25/hog marketed. This minimum ideal cost can be approached by aeration equipment that maintains redox potential of at least +10 mV Eh in an aerobic mixing zone that is no greater than one foot thick.

SUMMARY OF THE INVETION

The present invention relates to an aerator particularly useful to create and maintain a facultative lagoon for air pollution control, a method of forming and operating such a lagoon, and the resultant lagoon. An airlift aerator according to the invention includes a float to bouyantly sustain the device with respect to the lagoon surface. The device includes a U-shaped tube including a down flow leg and an airlift leg. The upper ends of the legs are upright such that the lower ends extend downward into the lagoon. The upper end of each leg is open to the lagoon near the surface thereof. Preferably the upper end of each leg has a horizontal portion forming an inlet in the case of the down flow leg, and an outlet in the case of the airlift leg. Preferably both the inlet and outlet are located in the targeted aerobic zone or layer. A source of pressurized air is connected to the airlift leg at a location toward the lower end thereof. The air source is connected to a bubble diffuser open to the airlift leg.

The airlift aerator is operated by supplying air under pressure to the bubble diffuser. Bubbles are generated inside of the airlift leg and move upward. This creates fluid circulation in the airlift aerator. Oxygen deprived surface water is drawn into the down flow leg. This water travels down the down flow leg, around the connecting elbow, and up the airlift leg. Oxygen is transferred from entrained air bubbles to the oxygen deprived water. The aerated water is discharged to the lagoon surface layer creating and maintaining an aerobic layer to the lagoon approaching the ideal condition where just enough aeration is supplied to biodegrade the hazardous and odorous gases that would otherwise be emitted into the atmosphere.

In terms of a method, a facultative lagoon is created and maintained by providing an airlift aerator having a down flow leg and an uplift leg connected at the bottom by an elbow. Air under pressure is supplied to the airlift leg through a bubble diffuser to create an up flow of aerated water that is discharged just under the surface of the lagoon.

IN THE DRAWINGS

DESCRIPTION OF A PREFERRED EMBODIMENT

Figure 1:
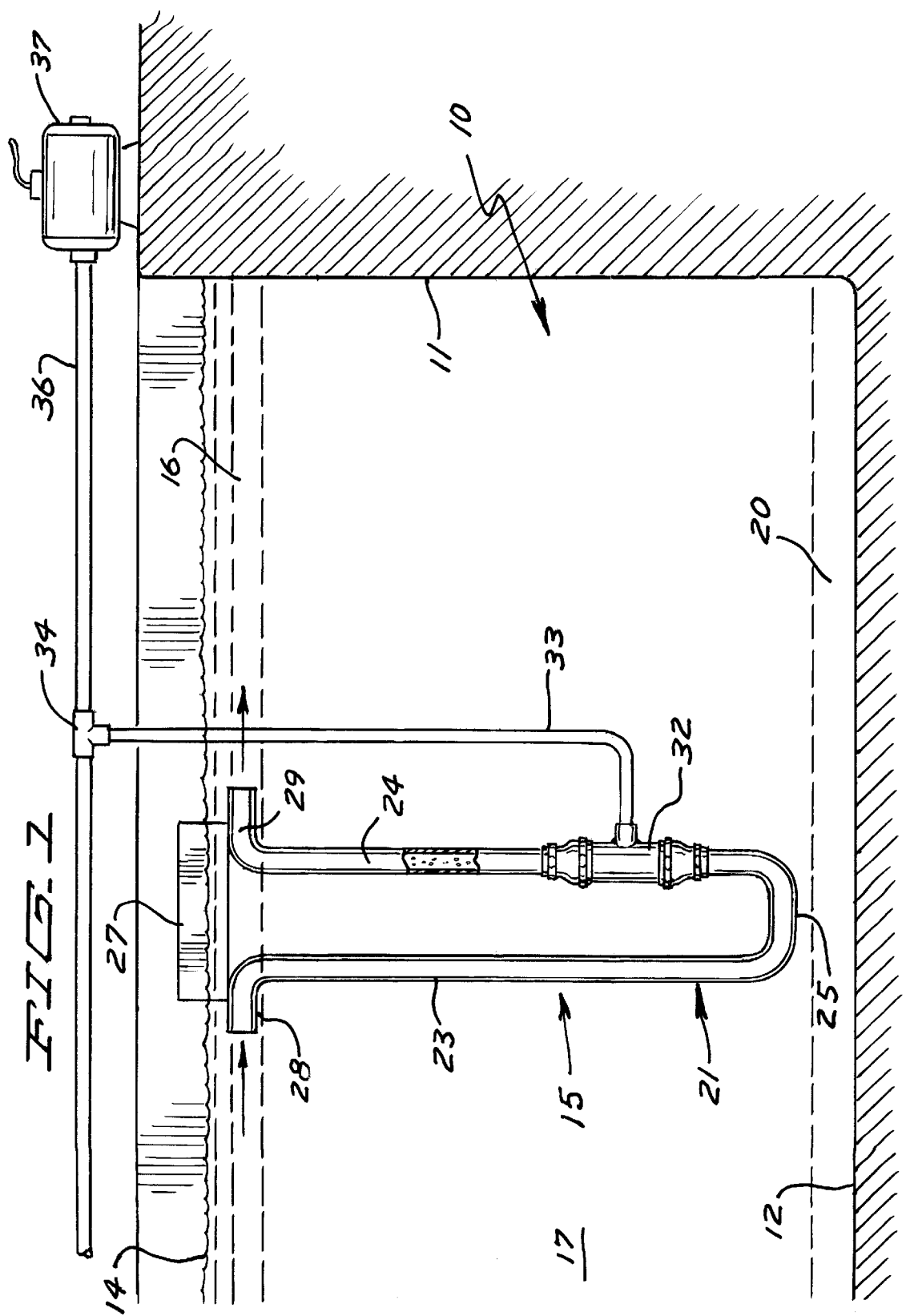
FIG. 1 shows an aerator according to the invention installed in a pollution control waste lagoon.

Referring to FIG. 1, there is shown an animal waste manure basin 10 which is formed by side walls 11 and a floor 12. The basin is filled with liquid, organic, anaerobic waste material. An airlift aerator according to the present invention is indicated at 15 and transforms the basin 10 into a facultative lagoon for air pollution control. The facultative lagoon has an aerobic layer 16 at the surface 14 of the lagoon and extending a short distance beneath the surface 14. The main body of waste contained in the basin 10 is comprised as untreated waste 17 mixed with or suspended in water. A sediment layer 20 can rest on the floor 12.

The aerobic layer 16 contains dissolved oxygen supplied by the aerator 15 whereby the offensive hazardous and odorous gasses generated in the anaerobic layer are biologically oxidized in the aerobic layer and released to the atmosphere as unoffensive gases.

Airlift aerator 15 includes a U-shaped tube body 21 that has a vertical down flow leg 23 and a vertical airlift leg 24. Legs 23, 24 are connected at the bottom ends by an elbow 25.

A float 27 connected by suitable means to the upper end of body 21 is sufficient to sustain the aerator 15 with respect to the surface 14 of the lagoon. The down flow leg 23 has a horizontal water inlet 28 at the top end thereof. The airlift leg 24 has a horizontal water outlet 29 at the top thereof facing opposite the direction of the water inlet 28. Both inlet 28 and outlet 29 are located in the targeted aerobic layer 16. Float 27 sustains the water inlet 28 and water outlet 29 a slight distance beneath the surface 14 of the lagoon.

A bubble generator or bubble diffuser 32 is connected to the airlift leg 24 at the lower end near the elbow 25. Bubble diffuser 32 is connected to air line 33 for receipt of air under pressure. The air line 33 extends to a tee 34 connected to a main air pipe 36 which extends to an air supply or pump 37. A number of aerators 15 can be interconnected in a single lagoon as will be presently described.

Bubble diffuser 32 generates bubbles in the water in the airlift leg 24 from air supplied under pressure through the air line 33. The bubbles rise in the airlift leg 24 and move the water with it creating a circulation through the U-shaped body 21 beginning at the water inlet 28 and discharging at the water outlet 29.

Figure 2:
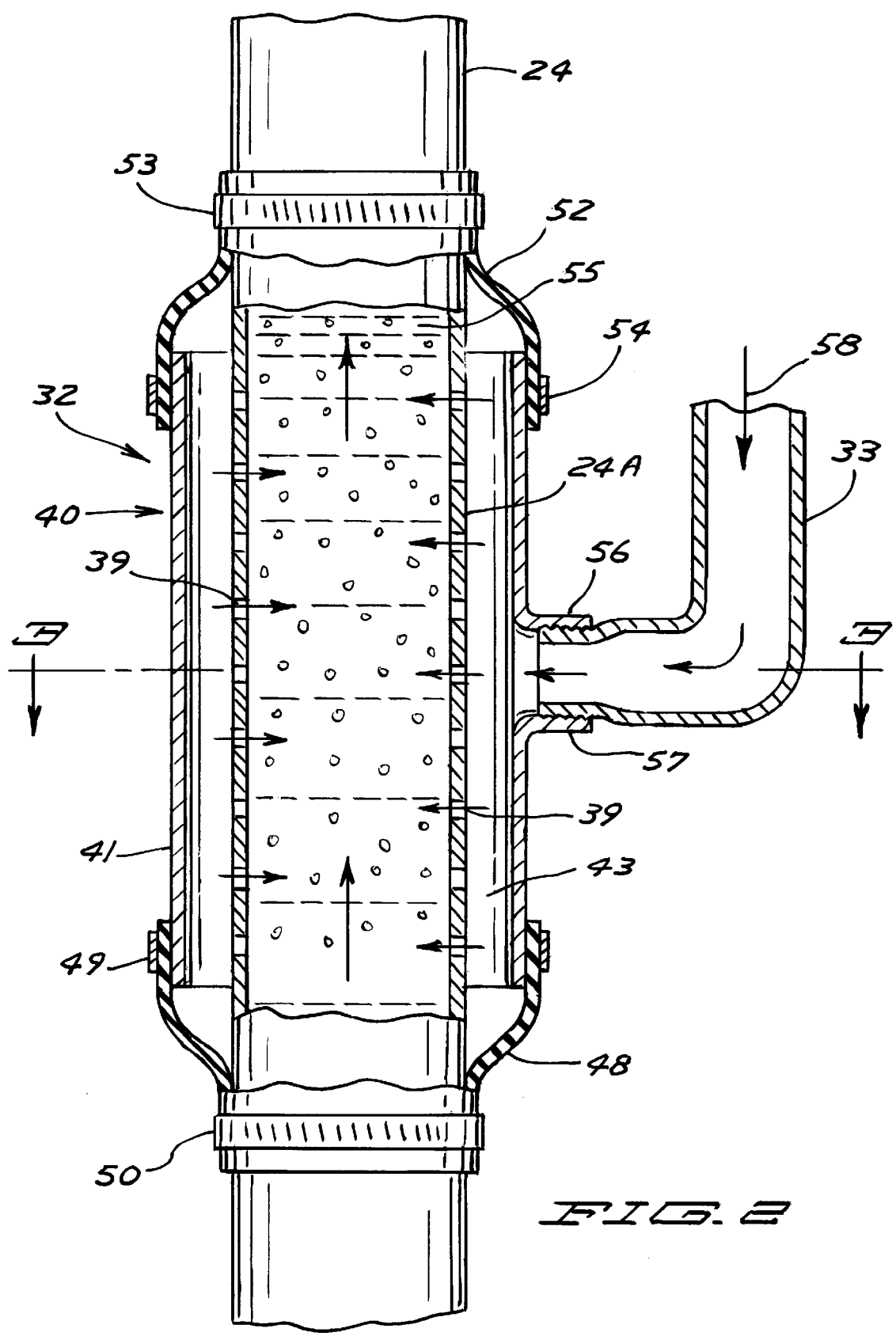
FIG. 2 is a view of a section of the airlift leg of the aerator of FIG. 1 with portions removed for purposes of illustrations.
Figure 3:
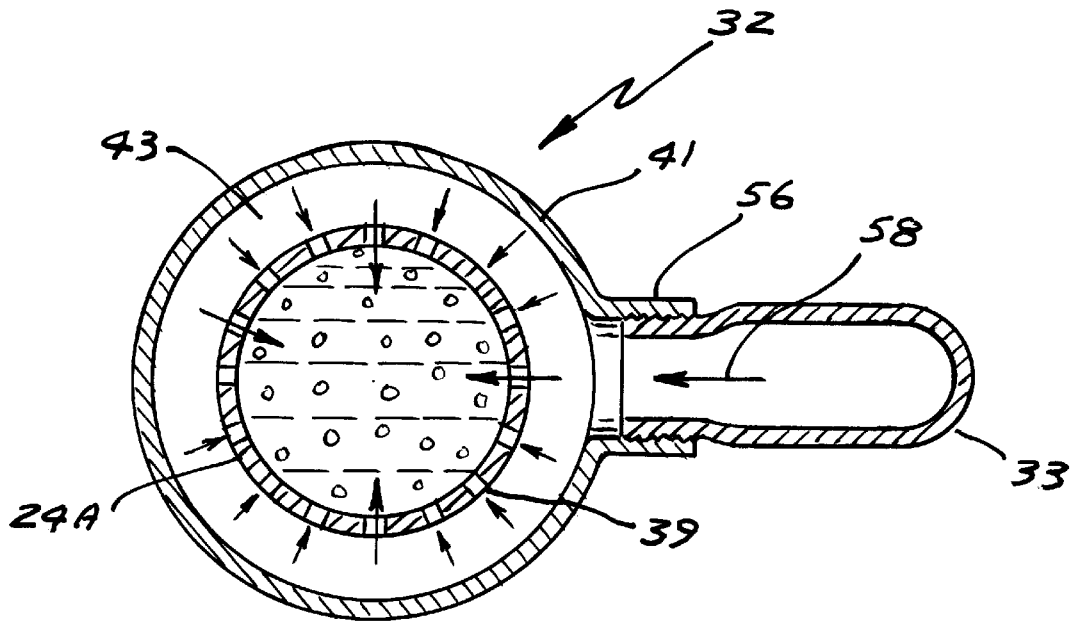
FIG. 3 is a sectional view of a portion of the airlift leg of the aerator shown in FIG. 2 taken along the line 3—3 thereof.

A particular bubble diffuser arrangement is shown in FIGS. 2 and 3. A section of the airlift leg 24A has a plurality of orifices or ports 39 for the creation of bubbles. Ports 39 are distributed evenly around the circumference of the section 24A, arranged in patterns one above the other in an orderly array. A bubble diffuser housing 40 comprises a sleeve like structure 41 that surrounds the section 24A. Sleeve 41 forms a diffuser chamber or plenum 43 around pipe section 24A. A lower boot or flexible coupler 48 secured by hose clamps 49, 50 covers the lower juncture of the sleeve 41 and the airlift pipe 24. An upper boot or flexible coupler 52 secured by hose clamps 53, 54 covers the juncture between the top of the sleeve 41 and the upwardly extending adjacent segment of the airlift pipe 24A.

Boss 56 attached to the side of the sleeve 41 opens to the diffuser chamber 43. Boss 56 connects with the end 57 of the air line 33. Air, indicated by the arrow 58, flows through the air line 33 through the boss 56 into the diffuser chamber or plenum 43.

In operation of the aerator 15, referring again to FIG. 1, the pump 37 is energized to provide air under pressure through the main air pipe 36 and through the air line 33 into the bubble diffuser 32. Air enters through the boss 56 into the diffuser or plenum chamber 43. The air passes through the ports 39 which are of a size such that the air enters the water passage through the pipe segment 24A as bubbles indicated at 55. The bubbles rise in the pipe segment 24A creating a water flow or circulation. Water enters the water inlet 28 of the down flow leg 23, following a path down the down flow leg, around the elbow 25 and up the air uplift leg 24. As it passes through the bubble diffuser, the water is entrained with air bubbles. Oxygen is transferred from the entrained air bubbles to the oxygen deprived water. The aerated water exits the water outlet 29. It disburses oxygen into the aerobic layer 16.

By way of example, the diameter of the pipe forming the U-shaped tube 21 can be 3 inches. An airflow rate of 1.2 liter per second can be provided. The aerated plume generated by the 3 inch diameter airlift aerator is estimated to be six meters wide at a distance of 15 meters away from the aerator. The length of the legs 23, 24 of the body 21 can be 5 feet which will correspond roughly to the depth that the aerator will be submerged at its maximum point beneath the surface 14 of the lagoon.

In terms of a method, a facultative lagoon is formed and maintained by providing one or more aerators each having a U-shaped body with a water inlet connected to a down flow leg, the down flow leg connected to an airlift leg, connected to a water outlet; providing a bubble diffuser at a lower end of the airlift leg; and supplying air under pressure to the bubble diffuser whereby a water circulation is established into the water inlet, down the down flow leg of the aerator, up the airlift leg, passing through the bubble diffuser where oxygen is diffused into the water, and disbursing the oxygen entrained water through the water outlet into an aerobic water layer of the lagoon.

Figure 4:
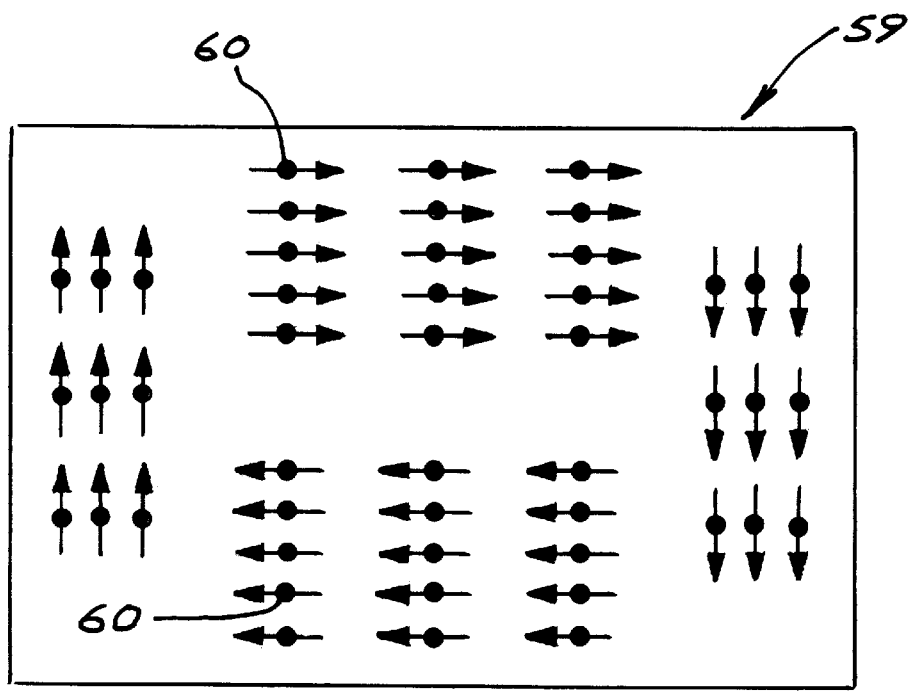
FIG. 4 is a schematic representation of a plurality of airlift aerators according to the invention installed in a pollution control basin to operate a facilitative lagoon for air pollution control.

A scheme for producing a facultative lagoon from a plurality of airlift aerators is shown in FIG. 4. A lagoon is indicated at 59. A plurality of airlift aerators 60 are installed in the lagoon in such a fashion as shown in order to induce circulation about the lagoon. The aerators are installed in rows and columns and arrange with water inlets and outlets oriented to form a circulatory flow pattern. An array of aerators is parallel to each side of the lagoon. The purpose is to create a one foot thick aerobic water layer with a redox potential of at least +10 mV, that circulates around the basin going from one line of airlift aerators to the next. The airlift aerators are placed in such a fashion that no jets of aerated water hit another head on, and so that no significant areas of stagement surface water exists. It is desirable to avoid both of these conditions as they would increase the release of hazardous odorous gases into the atmosphere. The first by increasing vertical mixing and bringing anaerobic water to the surface. The second condition increases the release of undesirable gases by creating anaerobic conditions at the water surface.

The embodiments of the invention in which an exclusive property or privilege is claimed are defined as follows:

1. A facultative lagoon comprising:

a lagoon basin;

a water based liquid organic anaerobic waste material in the basin;

at least one aerator located in the basin to create and maintain an aerobic layer at the surface of the waste material;

said aerator having a tubular U-shaped body including a down flow leg and an airlift leg, each leg having a top end and a bottom end, said legs being connected at the bottom end;

a water inlet to the down flow leg near the top end thereof, a water outlet from the airlift leg near the top end thereof, said U-shaped body being closed between the water inlet and water outlet;

means sustaining the U-shaped body submerged with respect to the surface of the material in the basin with the water inlet and water outlet submerged a short distance beneath the surface of the material and the down flow leg and airlift leg extending downwardly;

a bubble generator connected to the airlift leg near the lower end thereof;

air supply means connected to the bubble generator for disbursing bubbles into water located in the airlift leg whereby water circulation is established in the U-shaped body and oxygen is transferred from the bubbles to water discharged through the water outlet.

2. The facultative lagoon of claim 1 wherein:

means sustaining the U-shaped body with respect to the surface of the material comprises a float connected to the U-shaped body.

3. The facultative lagoon of claim 1 wherein:

the water inlet and water outlet are generally horizontally disposed and face in opposite directions.

4. The facultative lagoon of claim 3 wherein:

means sustaining the U-shaped body with respect to the surface of the material comprises a float connected to the U-shaped body.

5. The facultative lagoon of claim 3 including:

a plurality of aerators located in the basin arranged with water inlets and outlets oriented to form a circulatory flow pattern around the basin.

6. The facultative lagoon of claim 1 wherein:

said bubble generator includes a sleeve disposed just about a section of the airlift leg, said sleeve spaced from the section by a distance forming a plenum chamber;

means sealing the ends of the sleeve with respect to the section;

a plurality of ports for bubble formation in the section of the airlift leg open between the plenum chamber and the interior of the airlift leg;

means connecting the air supply means to the sleeve or introduction of air under pressure to the plenum chamber.

7. The facultative lagoon of claim 6 wherein:

the water inlet and water outlet are generally horizontally disposed and face in opposite directions.

8. The facultative lagoon of claim 7 including:

a plurality of aerators located in the basin arranged with water inlets and outlets oriented to form a circulatory flow pattern around the basin.

9. An airlift aerator for use in a pollution control lagoon having an aerobic layer and an anaerobic layer beneath the aerobic layer, comprising:

a U-shaped body with a tubular down flow leg and a tubular airlift leg;

said legs having upper and lower ends with means connecting the lower ends of the legs for water flow between them;

said upper ends being at approximately the same level when the U-shaped body is upright;

a water inlet to the down flow leg;

a water outlet from the airlift leg;

said U-shaped body closed between the water inlet and water outlet;

float means connected to the U-shaped body in a manner to buoyantly sustain the U-shaped body with respect to a fluid body, with the water inlet and water outlet submerged a short distance beneath the surface of the fluid body and the down flow leg and airlift leg downwardly extended, positioned to establish and maintain an aerobic layer in the fluid body;

a bubble generator connected to the interior of the airlift leg toward the lower end thereof; and means for connecting the bubble generator to a source of air under pressure for disbursing bubbles into water located in the airlift leg whereby when air under pressure is supplied to the bubble generator, bubbles are introduced into the airlift leg to establish water circulation in the U-shaped body and oxygen is transferred from the bubbles to water discharged through the water outlet.

10. The airlift aerator of claim 9 wherein:

the water inlet and water outlet are horizontally disposed when the U-shaped body is in an upright position.

11. The airlift aerator of claim 10 wherein:

the water inlet and water outlet face different directions.

12. The airlift aerator of claim 10 wherein:

the water inlet and water outlet face in opposite directions.

13. The airlift aerator of claim 10 including:

a supply of air under pressure connected to the bubble generator.

14. The airlift aerator of claim 13 wherein:

the water inlet and water outlet are horizontally disposed and face in opposite directions.

15. The airlift aerator of claim 10 wherein:

the means connecting the lower ends of the down flow leg and airlift leg comprises an elbow.

16. The airlift aerator of claim 10 wherein:

said bubble generator includes a sleeve disposed just about a section of the air uplift leg, said sleeve spaced from the section by a distance forming a plenum chamber;

means sealing the ends of the sleeve with respect to the section;

a plurality of ports for bubble formation in the section of the air uplift leg open between the plenum chamber and the interior of the air uplift leg;

means connecting the air supply means to the sleeve for introduction of air under pressure to the plenum chamber.

17. The airlift aerator of claim 16 wherein:

the water inlet and water outlet face in opposite directions.

18. A method of forming and operating a facultative lagoon of the type containing polluted waste material in a basin, with an aerobic layer and an anaerobic layer, comprising:

providing an airlift aerator having a closed U-shaped body with a down flow leg, an airlift leg connected to the down flow leg at its lower end, a bubble generator connected to the airlift leg, a water inlet to the down flow leg, and a water outlet from the airlift leg;

floating the U-shaped body from the surface of material collected in the lagoon basin with the water inlet and water outlet submerged a short distance beneath the material in a targeted aerobic layer and with the down flow leg and airlift leg extending down from the water inlet and water outlet; and supplying air under pressure to the bubble generator.

19. A facultative lagoon created according to the method of claim 18.

* * * * *